(12) United States Patent
LeGuyader

(10) Patent No.: US 7,428,963 B2
(45) Date of Patent: Sep. 30, 2008

(54) CONVEYOR BELT MADE OF PARA-ARAMID THREADS

(75) Inventor: Eric LeGuyader, Amiens (FR)

(73) Assignee: Etablissements E. Bourgeois, Dommartin (FR)

( * ) Notice: Subject to any disclaimer, the term of this patent is extended or adjusted under 35 U.S.C. 154(b) by 74 days.

(21) Appl. No.: 11/500,425

(22) Filed: Aug. 8, 2006

(65) Prior Publication Data

US 2008/0035455 A1   Feb. 14, 2008

(51) Int. Cl.
*B65G 15/32* (2006.01)
(52) U.S. Cl. .................................................. 198/846
(58) Field of Classification Search ............. 198/844.1, 198/846, 847
See application file for complete search history.

(56) References Cited

U.S. PATENT DOCUMENTS

| | | | | | |
|---|---|---|---|---|---|
| 3,979,930 | A | | 9/1976 | Schyns | |
| 4,407,333 | A | * | 10/1983 | Fowkes | 139/415 |
| 4,543,080 | A | * | 9/1985 | Tangorra | 474/204 |
| 5,326,411 | A | * | 7/1994 | Arnold | 156/137 |
| 5,421,450 | A | * | 6/1995 | Kitagawa et al. | 198/847 |
| 5,938,007 | A | * | 8/1999 | Fujihiro et al. | 198/847 |
| 6,294,489 | B1 | | 9/2001 | Lefort | |

FOREIGN PATENT DOCUMENTS

| DE | 38 43 811 A | 7/1990 |
|---|---|---|
| DE | 38 43 811 C | 7/1990 |

* cited by examiner

*Primary Examiner*—Mark A Deuble
(74) *Attorney, Agent, or Firm*—Kenyon & Kenyon LLP

(57) ABSTRACT

The woven conveyor belt, particularly in a plain weave, for the heat treatment of products, particularly textile threads, in the vapor phase, comprises warp threads exclusively made of para-aramid or para-aramid copolymer, preferably of a copoly-(paraphenylene/3,4'-oxydiphenylene terephthalamide). Preferably, the warp threads and the weft threads are made exclusively of para-aramid or para-aramid copolymer.

9 Claims, 1 Drawing Sheet

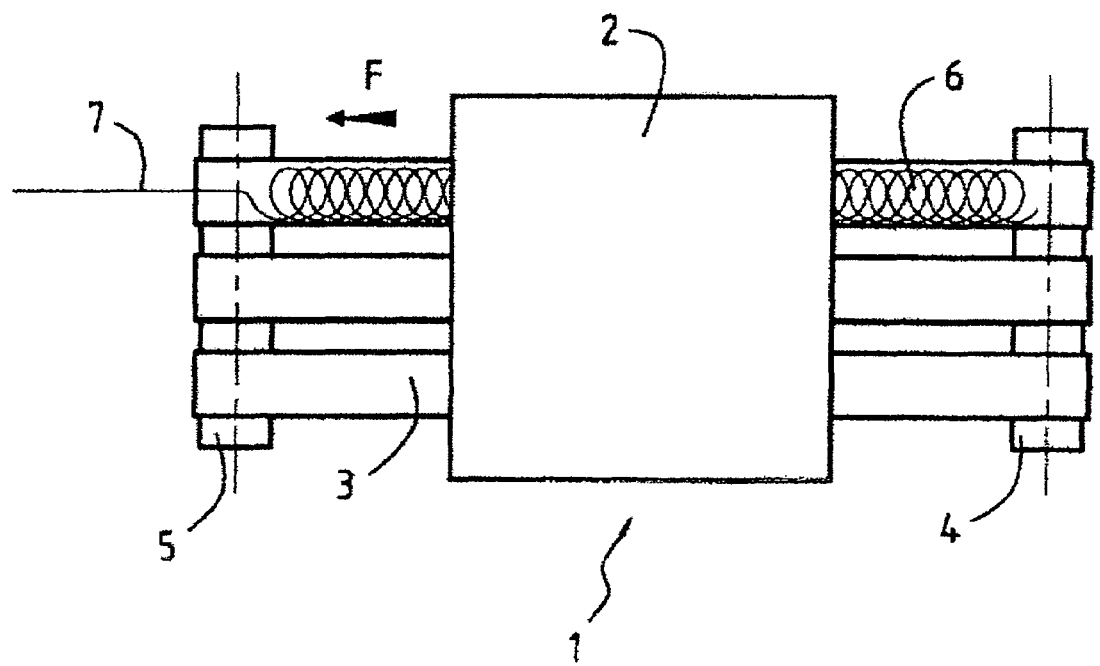

CONVEYOR BELT MADE OF PARA-ARAMID THREADS

FIELD OF THE INVENTION

This invention relates to a woven conveyor belt for the heat treatment of products, particularly textile threads, in the vapour phase.

In this text, the term "woven conveyor belt" is used to denote a textile part obtained by weaving that is shaped like a loop so that it can be placed on rolls and tensioned, at least one of the rolls being driven in rotation for a usually continuous displacement of said textile part, the upper strand of the textile part forming a surface capable of supporting products in order to displace them.

While products placed on the upper strand of the woven conveyor belt are being displaced, said products may be treated, particularly by a vapour phase heat treatment, as the conveyor belt passes through at least one heat treatment containment containing heat and steam generation means.

BACKGROUND OF THE INVENTION

The products are placed on the conveyor belt on the upstream portion of the treatment containment, pass through said containment and are then unloaded from the belt on the downstream part of the belt. The terms "upstream" and "downstream" are used with reference to the direction of displacement of the conveyor belt.

It is known that textile threads can be treated continuously in the vapour phase particularly for thermosetting.

Considering the treatment time necessary to obtain the required effect, it is preferable to place an accumulation of threads on the conveyor belt.

This is preferably done by depositing the thread on the upstream portion of the conveyor belt in an ordered configuration so that the width of the portion of belt occupied by the thread can be controlled. In particular, it is known that the thread can be deposited by applying a circular movement to it during continuous displacement of the conveyor belt, such that the turns of the thread partially overlap in a continuous sequence on the upper strand of the conveyor belt. The advantage of this presentation is particularly due to the ease with which the thread is picked up at the exit from the conveyor belt, despite shrinkage that may occur on the thread during its treatment in the containment. Other methods can be used to accumulate threads on the conveyor belt in an ordered configuration, for example a zigzag deposit in the form of transverse scanning over a determined width.

Several longitudinal accumulations of threads can be deposited on a single wide conveyor belt. However, and more generally, a narrower belt is usually used corresponding approximately to the width of a single accumulation of threads on the upstream portion of the conveyor belt.

This enables better flexibility of use of the same treatment installation.

Under these conditions, it can be understood that the conveyor belt must be capable of satisfying a number of technical constraints, due to successive passes between the ambient atmosphere in the room in which the installation is located and the ambient atmosphere internal to the treatment containment during the hot vapour phase, and also because the belt must be continuously subject to high tension so that its upper strand is as plane as possible.

Therefore, an ideal conveyor belt must have good dimensional stability both in length and in width, under treatment temperature and vapour conditions. It must also have good resistance to abrasion to prevent premature wear due to friction on the carrying rolls. It must also have good porosity so that the action of the vapour can take place throughout the entire volume of the threads accumulated on said belt. Finally it must remain straight when it is tensioned.

Materials conventionally used to make conveyor belts, namely polyester and polyamide, are incapable of achieving this ideal objective, particularly due to excessive elongations and poor resistance to temperature in time.

Some improvement has been obtained by using filaments known under the NOMEX® trademark that are meta-aramid threads, to make a conveyor belt. In particular, this improvement concerns the behaviour under high temperatures, since NOMEX® belts still have poor dimensional stability both in width and in length. In practice, it has been observed that there is a very significant reduction in the belt width after several days or weeks of operation, possible as high as 20%. The solution used to overcome this disadvantage is to make belts much wider than the theoretically desirable width, and then to adjust the tension on the installation at regular intervals until the width has stabilised at its minimum value.

This solution is not very satisfactory industrially.

BRIEF DESCRIPTION OF THE DRAWING

FIG. 1 illustrates a top view of a heat treatment installation equipped with conveyor belts in accordance with an embodiment of the present invention.

DETAILED DESCRIPTION

The purpose of this invention is to propose a conveyor belt that overcomes this disadvantage and that is close to the ideal belt defined above.

According to this invention, the conveyor belt woven for heat treatment of products in the vapour phase, and particularly textile threads, comprises warp threads exclusively made of para-aramid or para-aramid copolymer.

The best results were obtained with warp threads and possibly weft threads that are made of a para-aramid copolymer known under the TECHNORA® trademark, and which is a copoly-(paraphenylene/3,4'-oxydiphenylene terephthalamide) with the following formula:

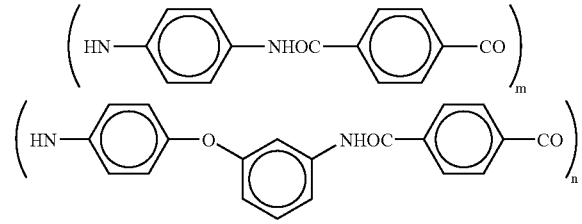

Preferably, the warp threads and the weft threads are exclusively made of para-aramid.

Preferably, this belt is woven in a plain weave.

In this case, it preferably comprises 15 to 17 threads per cm in warp and 7 to 8 picks per cm in weft.

This particular texture can result in very good porosity for steam to pass through.

Particularly for the transport of a textile thread in the form of an ordered accumulation of threads, the width of said belt is between 70 and 500 mm, and preferably between 150 and 250 mm.

Since it is particularly applicable to a conveyor belt for thermosetting of textile threads impregnated by a dye bath, characteristically the polyaramid threads and possibly other threads are free of oiling products. It is important that no oiling products can migrate onto textile threads deposited on the belt and pollute the dye before the dye can be thermoset onto the fibres.

The count of para-aramid threads used in the composition of the conveyor belt is preferably of the order of 1100 dtex.

This invention will be better understood after reading the description of a precise example embodiment given as a non-exclusive example, illustrated by the attached drawing in which the single figure is a diagrammatic representation of a top view of an installation for the heat treatment of textile threads in the vapour phase equipped with a set of narrow conveyor belts.

This installation 1 comprises a treatment containment equipped with means for the generation of hot saturated steam at a temperature of the order of 120 to 150° C. A set of narrow conveyor belts 3 between 150 and 250 mm wide pass through this containment. Only three belts are shown in the figure, but a much larger number could be used. In any case, the objective is that this number should be as large as possible as a function of the pass width available in the containment 2.

Each conveyor belt 3 is tensioned between rolls, particularly an upstream roll 4 at the entry to the installation 1 and a downstream roll 5 at the exit from the installation. One of the rolls 4, 5 is provided with rotation means for driving the belt 3 in the direction of the arrow F.

The installation 1 comprises a device, not shown, for depositing one or several threads on each belt 3, the deposition being done in a circular manner during displacement of the belt such that a continuous accumulation of turns 6 takes place as shown in the figure. This ordered accumulation of turns 6 passes through the containment 2 as far as the exit from the installation at which there is a device, not shown, for collection of the individual threads 7 forming said accumulation 6.

Each conveyor belt is composed exclusively of para-aramid threads or para-aramid copolymer threads, both in warp and in weft. They may be para-aramid threads known under the TWARON® and KEVLAR® tradenames. However, para-aramid copolymer threads known under the TECHNORA® tradename, that is a copoly-(paraphenylene/3,4'-oxydiphenylene terephthalamide), will preferably be used with the following formula:

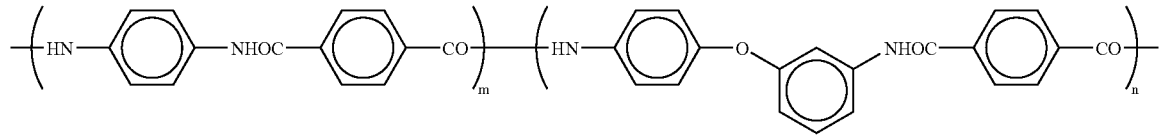

In fact, the belt 3 is formed by weaving using a plain weave, from TECHNORA® threads with a count of the order of 1100 dtex, with a warp of 16 threads per cm and a weft of 7.2 picks per cm. The belt may contain para-aramid threads only in warp and, for example, the weft threads may be made of meta-aramid, particularly NOMEX® threads.

The disproportion between the number of warp threads and weft threads as indicated above gives a good porosity enabling hot steam to pass through while maintaining good dimensional stability.

The use of such a conveyor belt can reduce or even eliminate oversizing of the belt width compared with the deposition width of the thread in the form of turns 6. It is thus possible to optimise the number of conveyor belts that could be used on the same installation for a given containment width 2.

The threads 7 deposited in the form of turns 6 on conveyor belts 3 have previously been impregnated with a dye bath; the heat treatment also thermosets the dye on the fibres. In this case, the threads making up the conveyor belts 3 must be free of any oiling product. Therefore a preliminary treatment can be carried out on said belt or fabric used to make the belt in order to eliminate such oiling products that could pollute the dye on the threads before thermosetting.

This invention is not limited to the precise example embodiment given above as a non-exhaustive example. In particular, variations in the count and the number of threads in warp and weft may occur as a function of the type of application concerned. The same is true for the weave that in particularly may be based on twill weave or a derivative of a twill weave.

The invention claimed is:

1. A woven conveyor belt for the heat treatment of products, particularly textile threads, in the vapor phase, which is constituted by only a textile part obtained by weaving of warp threads and weft threads with a weave texture giving a good porosity enabling the vapor to pass through and in which the warp threads are exclusively chosen from among a group composed of para-aramid and para-aramid copolymer threads.

2. The belt according to claim 1, wherein the warp threads are exclusively made of a para-ararnid copolymer.

3. The belt according to claim 2, wherein the warp threads are made of a copoly-(paraphenylene/3,4'-oxydiphenylene terephthalamide).

4. The belt according to claim 1, wherein warp threads and the weft threads are exclusively made of para-aramid copolymer.

5. The belt according to claim 1, wherein the belt is woven in a plain weave.

6. The belt according to claim 5, comprising 15 to 17 threads per cm in warp and 7 to 8 picks per cm in weft.

7. The belt according to claim 6, wherein, for the transport of at least a textile in the form of an ordered accumulation, its width is between 70 and 500 mm, and preferably between 150 and 250 mm.

8. The belt according to claim 7, for thermosetting of textile threads impregnated by a dye bath, wherein the para-aramid or para-aramid copolymer threads and other threads are free of oiling products.

9. The belt according to claim 1, wherein each para-aramid or para-aramid copolymer thread has a count of the order of 1100 dtex.

* * * * *